(12) United States Patent
Yu

(10) Patent No.: US 9,712,260 B2
(45) Date of Patent: Jul. 18, 2017

(54) HI-FI AUDIO DEVICE AND METHOD OF REMOVING NOISE OF POWER SUPPLY

(71) Applicant: IRIVER LIMITED., Seoul (KR)

(72) Inventor: Seung-Ho Yu, Seoul (KR)

(73) Assignee: IRIVER LIMITED., Seoul (KR)

( * ) Notice: Subject to any disclaimer, the term of this patent is extended or adjusted under 35 U.S.C. 154(b) by 0 days.

(21) Appl. No.: 14/981,915

(22) Filed: Dec. 29, 2015

(65) Prior Publication Data

US 2016/0197683 A1 Jul. 7, 2016

(30) Foreign Application Priority Data

Jan. 6, 2015 (KR) .................. 10-2015-0001252

(51) Int. Cl.
*H04B 15/00* (2006.01)

(52) U.S. Cl.
CPC ................... *H04B 15/005* (2013.01)

(58) Field of Classification Search
CPC .................................................... H04B 15/005
See application file for complete search history.

(56) References Cited

U.S. PATENT DOCUMENTS

| | | | | |
|---|---|---|---|---|
| 5,867,798 A * | 2/1999 | Inukai | ................. | H02J 7/0004 320/115 |
| 2005/0174233 A1* | 8/2005 | Kennedy | ............. | G08B 27/008 340/539.1 |
| 2006/0155545 A1* | 7/2006 | Jayne | ................... | G11B 31/02 704/272 |
| 2013/0328851 A1* | 12/2013 | Al-Dahle | ........... | G09G 3/3696 345/212 |
| 2014/0159663 A1 | 6/2014 | Miyanaga | | |

FOREIGN PATENT DOCUMENTS

| | | |
|---|---|---|
| JP | 63-190518 A | 8/1988 |
| JP | 2006-094677 A | 4/2006 |
| JP | 2007-258836 A | 4/2007 |
| JP | 2008-278631 A | 11/2008 |
| JP | 2014-011920 A | 1/2014 |
| KR | 20-1998-0044292 U | 9/1998 |
| KR | 10-2004-0034944 A | 4/2004 |

* cited by examiner

*Primary Examiner* — Muhammad N Edun
(74) *Attorney, Agent, or Firm* — Revolution IP, PLLC

(57) ABSTRACT

A hi-fi audio device for reproducing and outputting a hi-fi sound source, the hi-fi audio device including: an operation unit configured to operate the hi-fi audio device; and a power supply unit comprising: an alternating current (AC) power supply unit configured to rectify alternating current supplied from an external power supply into first direct current and supply the first direct current to the operation unit; and a battery unit configured to supply second direct current to the operation unit, wherein the operation unit receives the first direct current and drives the hi-fi audio device when the operation does not reproduce a sound source, and receives the second direct current and drives the hi-fi audio device while the operation unit reproduces the sound source, and while the sound source is reproduced, the supply of the first direct current to the operation unit is blocked.

16 Claims, 4 Drawing Sheets

HI-FI AUDIO DEVICE AND METHOD OF REMOVING NOISE OF POWER SUPPLY

CROSS REFERENCE TO RELATED APPLICATION

This application claims the benefit of Korean Patent Application No. 10-2015-0001252, filed Jan. 6, 2015, which is hereby incorporated by reference in its entirety into this application.

BACKGROUND OF THE INVENTION

Field of the Invention

One or more aspects of the present invention relate to a hi-fi audio device and a method of removing noise in a power supply.

Background Art

In general, an audio device is a system configured to record a sound wave that is in a range of sound that a human ear can hear (e.g., music, a human voice, natural sound, etc.) and an electrical signal converted from the sound wave, or to convert a recorded signal into the energy of a sound wave and emit the energy of the sound wave to the space.

A hi-fi audio device is an audio system capable of reproducing sound to be close to the original and uniformly from a low note to a high note within a human audible frequency range of 16 Hz to 20 kHz. The hi-fi audio device is very sensitive to noise, and particularly, to alternating current (AC) power-line noise occurring in an AC power supply used as an external power supply.

Electrical devices operating with an AC power supply are connected to a common power supply line. Thus, AC power-line noise occurring in one electrical device may cause another electrical device connected thereto via the common power supply line (ADD OK?) to malfunction, or the electrical device may be influenced by noise occurring in the other electrical device and thus malfunction. Thus, an AC power supply of an electronic device may act as an entrance or an exit through which noise penetrates into the electronic device. Furthermore, such noise may be a major factor that degrades the quality of sound reproduced by the hi-fi audio device.

The AC power-line noise may be classified as high frequency noise, pulse noise, or surge noise according to a voltage or waveform thereof.

The high frequency noise is a harmonic component contained mainly in a switching frequency of a computer, a switching power supply, etc., has a voltage of several of mV to several tens of mV, and always occurs when an electrical device is 'on' or 'off'.

The pulse noise occurs during switching of a relay or induction motor, and has a voltage which is higher than that of the high frequency noise. A peak voltage of the pulse noise may reach several thousands of volts.

The surge noise occurs in a power supply line mainly by induction lightning and has a voltage which is far higher than those of the high frequency noise and the pulse noise. A peak voltage of the surge noise may reach several tens of thousands of volts.

An electrical device including an integrated circuit (IC) chip may be directly influenced by the pulse noise and the surge noise, and may act as a source of generating the high frequency noise. Thus, the electrical device including the IC chip affects other electrical devices or the electrical device itself.

To solve problems caused by noise in a power supply as described above, a method of using a noise filter, a method of separating a panel board, etc. have been introduced. However, these methods are limited in that the size of an electrical device should be increased and a noise preventing device, etc. should be additionally included, and in view of an economic aspect.

Furthermore, in an audio device according to the related art, one battery supplies power to perform various operations, e.g., to reproduce a sound source, perform a system operation, amplify a sound source, etc. However, the intensities of current needed for elements of the audio device to perform the various operations are different. Thus, when an appropriate intensity of current is not supplied to each of these elements of the audio device, system noise occurs in the audio device according to the related art.

SUMMARY OF THE INVENTION

It is a main aspect of the present invention to provide a hi-fi audio device capable of removing noise from a power supply to reproduce high-quality sound, and a method of removing noise in a power supply.

To achieve these objects, the present invention provides a hi-fi audio device for reproducing and outputting a hi-fi sound source, the hi-fi audio device comprising: an operation unit configured to operate the hi-fi audio device; and a power supply unit comprising: an alternating current (AC) power supply unit configured to rectify alternating current supplied from an external power supply into first direct current and supply the first direct current to the operation unit; and a battery unit configured to supply second direct current to the operation unit, herein the operation unit receives the first direct current and drives the hi-fi audio device when the operation does not reproduce a sound source, and receives the second direct current and drives the hi-fi audio device while the operation unit reproduces the sound source, and while the sound source is reproduced, the supply of the first direct current to the operation unit is blocked.

While the sound source is reproduced, supply of current to the operation unit via a ground wire of the AC power supply is blocked.

While the operation unit reproduces the sound source, the power supply unit blocks the supply of the first direct current from the AC power supply to the operation unit and supplies the second direct current from the battery unit to the operation unit.

The power supply unit blocks supply of current to the operation unit via a ground wire of the AC power supply while the operation unit reproduces the sound source.

When the operation unit does not reproduce the sound source, the power supply unit blocks the supply of the second direct current from the battery unit to the operation unit and supplies the first direct current from the AC power supply to the operation unit.

When the operation unit does not reproduce the sound source, the power supply unit charges the battery unit by supplying the first direct current from the AC power supply to the battery unit.

The operation unit comprises a reproduction unit configured to reproduce the sound source; an amplification unit configured to amplify the sound source reproduced by the reproduction unit; and a system unit configured to perform a system operation of the hi-fi audio device.

The battery unit comprises a plurality of cells configured to supply direct current to the operation unit, and each of the reproduction unit, the amplification unit, and the system unit is operated by individually receiving the direct current from at least one among the plurality of cells.

The plurality of cells have different potentials according to objects to which the plurality of cells are respectively connected.

The AC power supply comprises a power supply connected to the external power supply to receive the alternating current from the external power supply; and a rectification unit configured to rectify the alternating current into the first direct current.

A hi-fi audio device for reproducing and outputting a hi-fi sound source, the hi-fi audio device comprising an operation unit configured to operate the hi-fi audio device; a power supply unit comprising: an alternating current (AC) power supply unit configured to rectify alternating current supplied from an external power supply into first direct current and supply the first direct current to the operation unit; and a battery unit configured to supply second direct current to the operation unit; a switching unit configured to control power to be supplied from the power supply to the operation unit or block the supply of the power from the power supply to the operation unit; and a control unit configured to control the switching unit to supply the first direct current or the second direct current to the operation unit according to whether the operation unit reproduces a sound source.

The control unit determines whether the operation unit reproduces the sound source, and controls the switching unit to supply the second direct current from the battery unit to the operation unit and block the supply of the first direct current from the AC power supply to the operation unit when it is determined that the operation reproduces the sound source.

While the operation unit reproduces the sound source, the control unit controls the switching unit to block current from being supplied to the operation unit via a ground wire of the AC power supply.

The control unit determines whether the operation unit reproduces the sound source, and controls the switching unit to block the supply of the second direct current from the battery unit to the operation unit and supply the first direct current from the AC power supply to the operation unit when it is determined that the operation unit does not reproduce the sound source.

When the operation unit does not reproduce the sound source, the control unit controls the switching unit to charge the battery unit by supplying the first direct current from the AC power supply to the battery unit.

The control unit comprises a determination unit configured to whether the operation unit reproduces the sound source; and a switching controller configured to control the switching unit to supply the second direct current to the operation unit and block the supply of the first direct current to the operation unit while the operation unit reproduces the sound source, and control the switching unit to block the supply of the second direct current to the operation unit and supply the first direct current to the operation unit when the operation unit does not reproduce the sound source.

While the operation unit reproduces the sound source, the switching controller controls the switching unit to block current from being supplied to the operation unit via a ground wire of the AC power supply.

When the operation unit does not reproduce the sound source, the switching controller controls the switching unit to charge the battery unit by supplying the first direct current from the AC power supply to the battery unit.

A method of removing noise of a power supply of a hi-fi audio device which includes a power supply unit including an alternating current (AC) power supply unit and a battery unit, an operation unit, a switching unit, and a control unit and which is configured to reproduce and output a hi-fi sound source, the method comprising: determining whether the operation unit reproduces a sound source; blocking first direct current from being supplied to the operation unit from the AC power supply and allowing the battery unit to supply second direct current to the operation unit when it is determined that the operation unit reproduces the sound source; and blocking the supply of the second direct current from the battery unit to the operation unit and allowing the AC power supply to supply the first direct current to the operation unit when it is determined that the operation unit does not reproduce the sound source.

When it is determined that the operation unit does not reproduce the sound source, further comprising charging the battery unit by the AC power supply.

DETAILED DESCRIPTION

Figure 1:
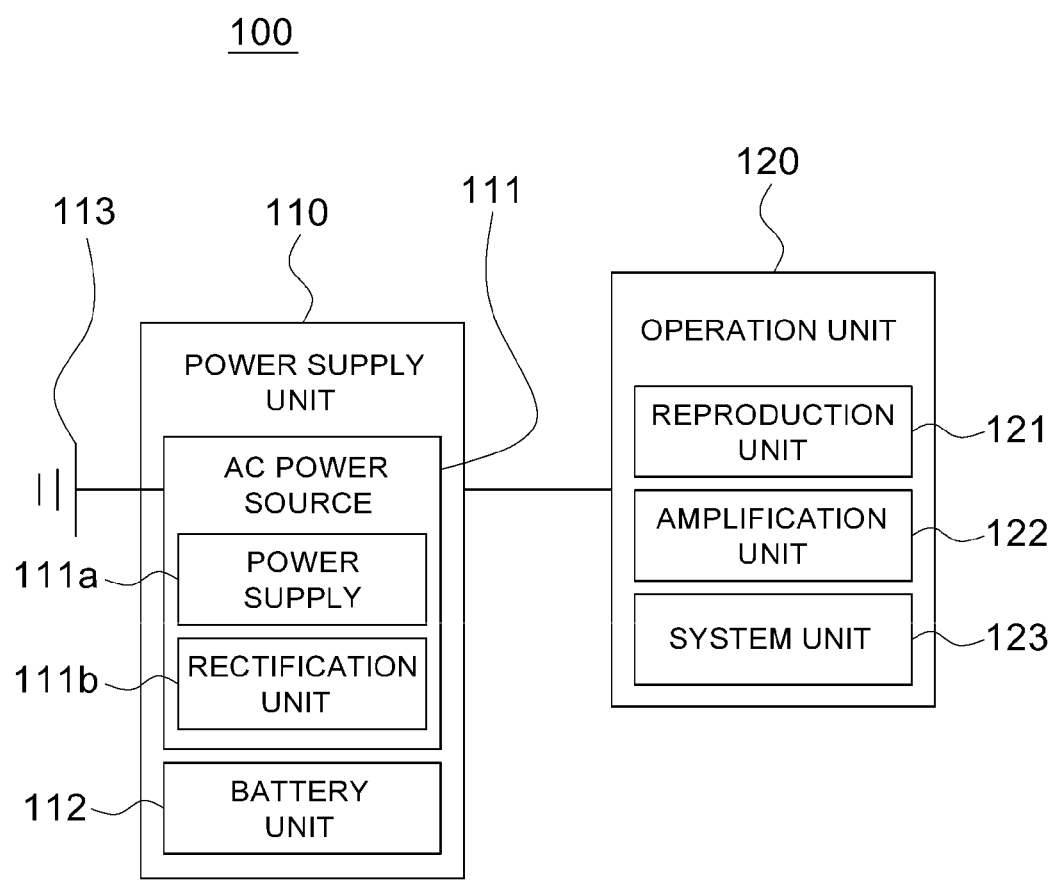
FIG. 1 is a diagram schematically illustrating the structure of a hi-fi audio device according to an embodiment of the present invention.

The present invention may be embodied in many different forms and accomplished in various embodiments. Thus, exemplary embodiments are illustrated in the drawings and particularly described in the detailed description. However, these embodiments are not intended to restrict the present invention and should be understood to cover all modifications, equivalents, and alternatives falling within the scope of the invention.

In the following description, well-known functions or constructions are not described in detail if it is determined that they would obscure the invention due to unnecessary detail. Also, numbers used herein (e.g., 'first', 'second,' etc.) may be identification symbols for distinguishing one element from another component.

Also, it will be understood that when one element is referred to as being 'coupled to' or 'connected to' another element, the element may be directly coupled or connected to the other element or may be coupled or connected to the other element via an intervening element unless otherwise defined.

Hereinafter, exemplary embodiments of the present invention will be described with reference to the accompanying drawings.

FIG. 1 is a diagram schematically illustrating the structure of a hi-fi audio device 100 according to an embodiment of the present invention.

Referring to FIG. 1, the hi-fi audio device 100 according to an embodiment of the present invention may include a power supply unit 110 and an operation unit 120.

In the power supply unit 110, alternating current supplied from an external power supply may be rectified into first direct current and the first direct current may be supplied to the operation unit 120, or a battery unit 112 may supply second direct current to the operation unit 120. More specifically, while the operation unit 120 reproduces a sound source, the power supply unit 110 blocks the supply of the first direct current from an alternating current (AC) power source 111 to the operation unit 120, and supply the second direct current from the battery unit 112 to the operation unit 120.

The AC power source 111 is connected to a common power supply line, and receives alternating current via the common power supply line and rectifies the alternating current into the first direction current. However, power noise is contained in the alternating current supplied via the common power supply line. Even if the alternating current is rectified into the first direct current, the noise is still contained in the first direct current. Also, since another electrical device may be connected to the common power supply line, noise occurring when the other electrical device is 'on' or 'off' or malfunctions may be transferred to the AC power source 111 of the hi-fi audio device 100 via the common power supply line. Since the hi-fi audio device 100 is configured to reproduce a high-quality sound source, a hi-fi sound may be influenced by noise occurring in an external power supply or an external electrical device and thus the quality of the hi-fi sound source may be degraded when the hi-fi sound source is reproduced.

According to an embodiment of the present invention, when the operation unit 120 reproduces a sound source, the sound source is reproduced by blocking supply of power from the AC power source 111 and receiving the second direct current from the battery unit 112. Thus, degradation of the quality of the sound source due to noise occurring due to external alternating current and an external electrical device may be minimized.

Noise transferred via the common power supply line may be also transferred to the hi-fi audio device 100 via a ground wire. Thus, according to an embodiment of the present invention, while the operation unit 120 reproduces a sound source, the power supply unit 110 may block current from being supplied to the operation unit 120 via a ground wire 113 of the AC power source 111.

Also, when the operation unit 120 does not reproduce the sound source, the power supply unit 110 may block the supply of the second direct current from the battery unit 112 to the operation unit 120 and supply the first direct current from the AC power source 111 to both of the operation unit 120 and the battery unit 112, thereby charging the battery unit 112. Reproducing of a sound source is most influenced by power line noise. The battery unit 112 is configured to supply an amount of current charged therein. Thus, according to an embodiment of the present invention, when the system of the hi-fi audio device 100 is driven without reproducing a sound source, the supply of the second direct current from the battery unit 112 may be blocked, and the first direct current may be supplied from the AC power source 111 to drive the operation unit 120 and charge the battery unit 112.

For example, the power supply unit 110 may include the AC power source 111 and the battery unit 112.

The AC power source 111 may rectify alternating current supplied from an external power supply into first direct current, and supply the first direct current to the operation unit 120. The AC power source 111 may include a power supply 111*a* connected to the external power supply to receive the alternating current, and a rectification 111*b* configured to rectify the alternating current into the first direct current.

When the operation unit 120 reproduces a sound source, the supply of the first direct current to the operation unit 120 via the ground wire 113 of the AC power supply 111 may be blocked.

The battery unit 112 may supply second direct current to the operation unit 120. For example, the battery unit 112 may have a structure as illustrated in FIG. 2.

Figure 2:
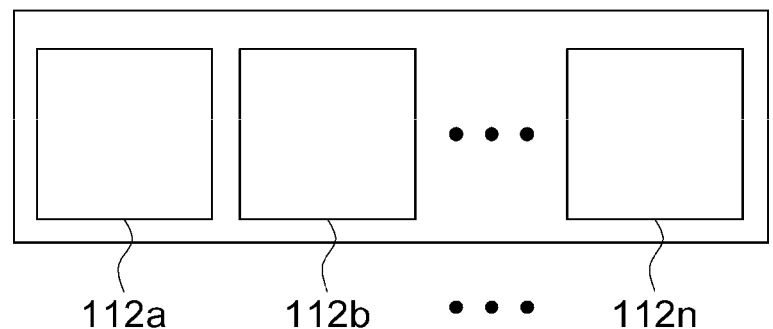
FIG. 2 is a diagram schematically illustrating a battery unit of a hi-fi audio device according to an embodiment of the present invention.

FIG. 2 is a diagram schematically illustrating the battery unit 120 of the hi-fi audio device 100 of FIG. 1 according to an embodiment of the present invention.

Referring to FIGS. 1 and 2, the battery unit 112 may include a plurality of cells 112*a* to 112*n* configured to supply direct current to the operation unit 120. The plurality of cells 112*a* to 112*n* may be respectively connected to a reproduction unit 121, an amplification unit 122, and a system unit 123 of the operation unit 120 to supply direct current thereto. The plurality of cells 112*a* to 112*n* may have different potentials according to objects to which the plurality of cells 112*a* to 112*n* are connected. For example, the reproduction unit 121 may be connected to the first cell 112*a* to receive direct current and reproduce the sound source. The amplification unit 122 may be connected to the second cell 112*b* to receive the direct current and amplify the sound source. The system unit 123 may be connected to a third cell (not shown) to receive the direct current and perform a system operation.

An audio device according to the related art receives alternating current from an external power supply, and supplies the alternating current to perform various operations, e.g., to reproduce a sound source, perform a system operation, amplify the sound source, etc. In this case, the intensities of current needed for elements of the audio device to perform the various operations are different. Accordingly, a desired intensity of current is not supplied to each of the elements of the audio device to perform the various operations and thus system noise occurs in the audio device according to the related art.

In the hi-fi audio device 100 according to an embodiment of the present invention, the battery unit 112 includes the plurality of cells 112*a* to 112*n* having different electric potentials according to objects to which the plurality of cells 112*a* to 112*n* are connected as described above. At least one among the plurality of cells 112*a* to 112*n* is individually connected to the reproduction unit 121, the amplification unit 122, and the system unit 123 of the operation unit 120 to supply the direct current thereto. Thus, separate cells may independently supply desired amounts of current to the reproduction unit 121, the amplification unit 122, and the system unit 123, thereby blocking system noise occurring in the hi-fi audio device 100 when the hi-fi audio device 100 operates.

Also, while the operation unit 120 reproduces the sound source, the battery unit 112 may supply the second direct current to the operation unit 120 after supply of current from the AC power source 111 via the ground wire 113 is blocked.

When the operation unit 120 does not reproduce the sound source, the power supply unit 110 may charge the battery unit 112 by supplying the first direct current supplied from the AC power source 111 to the battery unit 112.

As described above, while the operation unit 120 reproduces a sound source, the power supply unit 110 may block the first direct current supplied from the AC power source 111 and allow the battery unit 112 to supply the second direct current, thereby blocking noise occurring in an external power supply. Also, the battery unit 112 includes the plurality of cells 112a to 112n having different potentials according to objects to which the plurality of cells 112a to 112n are connected, so that at least one among the plurality of cells 112a to 112n may be individually connected to the reproduction unit 121, the amplification unit 122, the system unit 123, etc. Of the operation unit 120 to supply the direct current thereto. Thus, system noise occurring when the same potential difference provided from a battery included in a hi-fi audio device according to the related art is used may be blocked.

The operation unit 120 may operate the hi-fi audio device 100 according to an embodiment of the present invention. When the operation unit 120 does not reproduce the sound source, the operation unit 120 may receive the first direct current from the AC power source 111 of the power supply unit 110 and drive the hi-fi audio device 100 according to an embodiment of the present invention. While the operation unit 120 reproduces the sound source, the supply of the first direct current to the operation unit 120 from the AC power source 111 via the ground wire 113 of the AC power source 111 may be blocked and the operation unit 120 may be driven by the second direct current supplied from the battery unit 112.

The operation unit 120 may include the reproduction unit 121, the amplification unit 122, and the system unit 123.

The reproduction unit 121 may reproduce the sound source by receiving the second direct current from the battery unit 112 of the power supply unit 110.

The amplification unit 122 may amplify the sound source reproduced by the reproduction unit 121. The amplification unit 122 may be connected to the AC power source 111 or the battery unit 112 of the power supply unit 110. When the operation unit 120 reproduces the sound source, the operation unit 120 may operate by receiving the second direct current from the battery unit 112. When the operation unit 120 does not reproduce the sound source, the operation unit 120 may operate by receiving the first direct current from the AC power source 111.

The system unit 123 may perform a system operation of the hi-fi audio device 100 according to an embodiment of the present invention. Here, the system operation means driving an internal element of the hi-fi audio device 100 except for reproducing a sound source and amplifying the reproduced sound source.

The system unit 123 may be connected to the AC power source 111 or the battery unit 112 of the power supply unit 110. The system unit 123 may operate by receiving the second direct current from the battery unit 112 while the operation unit 120 reproduces the sound source, and operate by receiving the first direct current from the AC power source 111 when the operation unit 120 does not reproduce the sound source.

Figure 3:
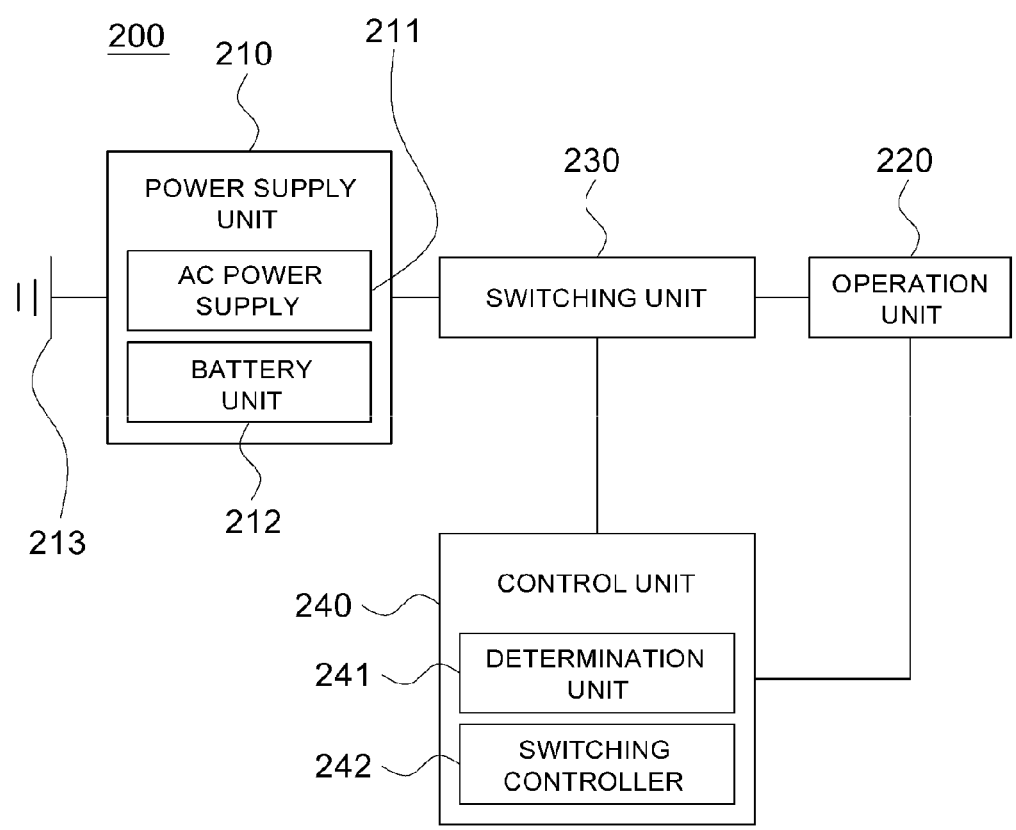
FIG. 3 is a diagram schematically illustrating the structure of a hi-fi audio device according to another embodiment of the present invention.

FIG. 3 is a diagram schematically illustrating the structure of a hi-fi audio device 200 according to another embodiment of the present invention.

Referring to FIG. 3, the hi-fi audio device 200 according to another embodiment of the present invention may include a power supply unit 210, an operation unit 220, a switching unit 230, and a control unit 240.

The switching unit 230 may control power to be supplied from the power supply unit 210 to the power supply unit 210 or block the supply of the power from the power supply unit 210 to the power supply unit 210.

When the operation unit 220 reproduces a sound source, the switching unit 230 may allow a battery unit 212 to supply second direct current to the operation unit 220 or block first direct current from being supplied from an AC power supply 211 to the operation unit 220 via a ground wire 213 of the AC power supply 211, under control of a switching controller 242 of the control unit 240.

When the operation unit 220 does not reproduce the sound source, the switching unit 230 may block the supply of the second direct current from the battery unit 212 to the operation unit 220 or allow the AC power supply 211 to supply the first direct current to the operation unit 220, under control of the switching controller 242.

The control unit 240 may control the switching unit 230 to supply the first direct current or the second direct current to the operation unit 220 according to whether the operation unit 220 reproduces the sound source.

The control unit 240 may include a determination unit 241 and the switching controller 242.

The determination unit 241 may determine whether the operation unit 220 reproduces the sound source, and supply a signal to the switching controller 242 to control the switching unit 230, based on a result of determining whether the operation unit 220 reproduces the sound source.

When the determination unit 241 determines that the operation unit 220 reproduces the sound source, the switching controller 242 may control the switching unit 230 to block the supply of the first direct current to the operation unit 220 from the AC power supply 211 via the ground wire 213 of the AC power supply 211 and to supply the second direct current to the operation unit 220 from the battery unit 212.

When the determination unit 241 determines that the operation unit 220 does not reproduce the sound source, the switching controller 242 may control the switching unit 230 to block the supply of the second direct current to the operation unit 220 from the battery unit 212 and to supply the first direct current the operation unit 220 from the AC power supply 211. Furthermore, when the determination unit 241 determines that the operation unit 220 does not reproduce the sound source, the switching controller 242 may control the switching unit 230 to charge the battery unit 212 by supplying the first direct current to the battery unit 212 from the AC power supply 211.

Figure 4:
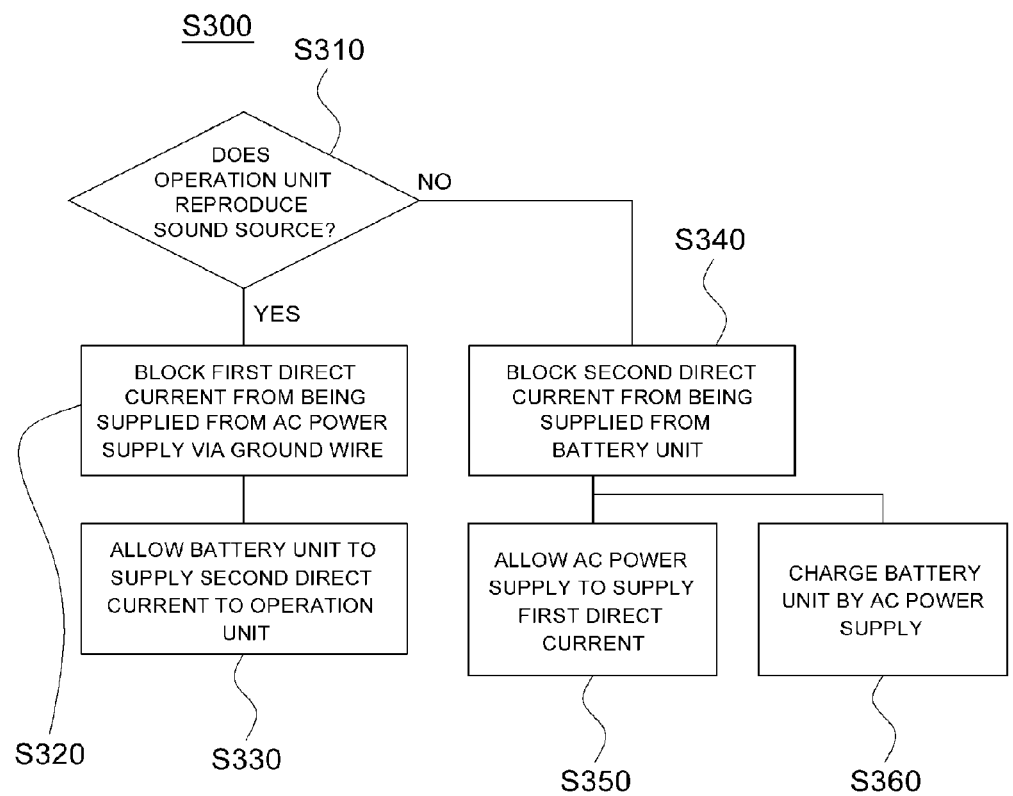
FIG. 4 is a flowchart of a process of cutting off the supply of power in a hi-fi audio device, according to an embodiment of the present invention.

FIG. 4 is a flowchart of a process of cutting off the supply of power in the hi-fi audio device 200, according to an embodiment of the present invention.

Referring to FIGS. 3 and 4, the determination unit 241 determines whether the operation unit 220 reproduces a sound source (operation S310).

When the operation unit 220 reproduces the sound source, the switching controller 242 controls the switching unit 230 to block first direct current from being supplied from the AC power supply 211 via the ground wire 213 of the AC power supply 211 (operation S320).

Also, the switching controller 242 controls the switching unit 230 to supply second direct current from the battery unit 212 to the operation unit 220 (operation S330).

When the operation unit 220 does not reproduces the sound source, the switching controller 242 controls the switching unit 230 to block the supply of the second direct current from the battery unit 212 (operation S340).

Also, the switching controller 242 controls the switching unit 230 to allow the AC power supply 211 to supply the first direct current (operation S350).

Also, the switching controller 242 controls the switching unit 230 to charge the battery unit 212 by the AC power supply 211 (operation S360).

As described above with reference to FIGS. 1 to 4, in the hi-fi audio device 100 (or 200) according to an embodiment of the present invention, while the sound source is reproduced, the first direct current supplied from the AC power source 111 (or 211) may be controlled to be blocked and the second direct current may be controlled to be supplied from the battery unit 112 (or 212), thereby blocking noise caused by alternating current supplied from an external power supply.

Also, another problem of an audio device according to the related art (i.e., internal system noise occurring when each operation of the audio device according to the related art is performed using one battery) may be solved by supplying only an amount of current needed to perform each operation of an audio device by setting potentials of the plurality of cells 112*a* to 112*n*, which are included in the battery unit 112 (or 212) of the hi-fi audio device 100 (or 200) according to an embodiment of the present invention, to be different and individually supplying direct current according to an object to which each of the plurality of cells 112*a* to 112*n* is connected.

According to one embodiment of the present invention, high-quality sound may be reproduced by removing noise occurring in a power supply by reproducing sound using charged power while blocking AC power.

Although the present invention has been described above with reference to the exemplary embodiments thereof, it would be understood by those skilled in the art that various changes and modifications may be made without departing from the technical conception and essential features of the present invention.

Thus, the exemplary embodiments set forth herein should be considered in descriptive sense only and not for purposes of limitation. Therefore, the scope of the invention is defined not by the detailed description of the invention but by the appended claims.

Thus, it is clear that all modifications are included in the technical scope of the present invention as long as they include the components as claimed in the claims of the present invention.

What is claimed is:

1. A hi-fi audio device for reproducing and outputting a hi-fi sound source, the hi-fi audio device comprising:
   an operation unit configured to operate the hi-fi audio device; and
   a power supply unit comprising:
      an alternating current (AC) power supply unit configured to rectify alternating current supplied from an external power supply into first direct current and supply the first direct current to the operation unit; and
      a battery unit configured to supply second direct current to the operation unit, wherein the operation unit receives the first direct current and drives the hi-fi audio device when the operation does not reproduce a sound source, and receives the second direct current and drives the hi-fi audio device while the operation unit reproduces the sound source, and while the sound source is reproduced, the supply of the first direct current to the operation unit is blocked, wherein
   while the sound source is reproduced, supply of current to the operation unit via a ground wire of the AC power supply is blocked, and wherein
   the power supply unit blocks supply of current to the operation unit via a ground wire of the AC power supply while the operation unit reproduces the sound source.

2. The hi-fi audio device of claim 1, wherein, while the operation unit reproduces the sound source, the power supply unit blocks the supply of the first direct current from the AC power supply to the operation unit and supplies the second direct current from the battery unit to the operation unit.

3. The hi-fi audio device of claim 1, wherein, when the operation unit does not reproduce the sound source, the power supply unit blocks the supply of the second direct current from the battery unit to the operation unit and supplies the first direct current from the AC power supply to the operation unit.

4. The hi-fi audio device of claim 3, wherein, when the operation unit does not reproduce the sound source, the power supply unit charges the battery unit by supplying the first direct current from the AC power supply to the battery unit.

5. The hi-fi audio device of claim 1, wherein the operation unit comprises:
   a reproduction unit configured to reproduce the sound source;
   an amplification unit configured to amplify the sound source reproduced by the reproduction unit; and
   a system unit configured to perform a system operation of the hi-fi audio device.

6. The hi-fi audio device of claim 5, wherein the battery unit comprises a plurality of cells configured to supply direct current to the operation unit, and
   each of the reproduction unit, the amplification unit, and the system unit is operated by individually receiving the direct current from at least one among the plurality of cells.

7. The hi-fi audio device of claim 6, wherein the plurality of cells have different potentials according to objects to which the plurality of cells are respectively connected.

8. The hi-fi audio device of claim 1, wherein the AC power supply comprises:
   a power supply connected to the external power supply to receive the alternating current from the external power supply; and
   a rectification unit configured to rectify the alternating current into the first direct current.

9. A hi-fi audio device for reproducing and outputting a hi-fi sound source, the hi-fi audio device comprising:
   an operation unit configured to operate the hi-fi audio device;
   a power supply unit comprising:
      an alternating current (AC) power supply unit configured to rectify alternating current supplied from an external power supply into first direct current and supply the first direct current to the operation unit; and
      a battery unit configured to supply second direct current to the operation unit;
   a switching unit configured to control power to be supplied from the power supply to the operation unit or block the supply of the power from the power supply to the operation unit; and
   a control unit configured to control the switching unit to supply the first direct current or the second direct current to the operation unit according to whether the operation unit reproduces a sound source, wherein
   the control unit determines whether the operation unit reproduces the sound source, and controls the switching unit to supply the second direct current from the battery unit to the operation unit and block the supply of the first direct current from the AC power supply to the operation unit when it is determined that the operation reproduces the sound source, and wherein while the operation unit reproduces the sound source, the control unit controls the switching unit to block current from being supplied to the operation unit via a ground wire of the AC power supply.

10. The hi-fi audio device of claim 9, wherein the control unit determines whether the operation unit reproduces the sound source, and controls the switching unit to block the supply of the second direct current from the battery unit to the operation unit and supply the first direct current from the AC power supply to the operation unit when it is determined that the operation unit does not reproduce the sound source.

11. The hi-fi audio device of claim 10, wherein, when the operation unit does not reproduce the sound source, the control unit controls the switching unit to charge the battery unit by supplying the first direct current from the AC power supply to the battery unit.

12. The hi-fi audio device of claim 9, wherein the control unit comprises:
 a determination unit configured to whether the operation unit reproduces the sound source; and
 a switching controller configured to control the switching unit to supply the second direct current to the operation unit and block the supply of the first direct current to the operation unit while the operation unit reproduces the sound source, and control the switching unit to block the supply of the second direct current to the operation unit and supply the first direct current to the operation unit when the operation unit does not reproduce the sound source.

13. The hi-fi audio device of claim 12, wherein, while the operation unit reproduces the sound source, the switching controller controls the switching unit to block current from being supplied to the operation unit via a ground wire of the AC power supply.

14. The hi-fi audio device of claim 12, wherein, when the operation unit does not reproduce the sound source, the switching controller controls the switching unit to charge the battery unit by supplying the first direct current from the AC power supply to the battery unit.

15. A method of removing noise of a power supply of a hi-fi audio device which includes a power supply unit including an alternating current (AC) power supply unit and a battery unit, an operation unit, a switching unit, and a control unit and which is configured to reproduce and output a hi-fi sound source, the method comprising:
 determining whether the operation unit reproduces a sound source;
 blocking first direct current from being supplied to the operation unit from the AC power supply and allowing the battery unit to supply second direct current to the operation unit when it is determined that the operation unit reproduces the sound source; and
 blocking the supply of the second direct current from the battery unit to the operation unit and allowing the AC power supply to supply the first direct current to the operation unit when it is determined that the operation unit does not reproduce the sound source.

16. The method of claim 15, when it is determined that the operation unit does not reproduce the sound source, further comprising charging the battery unit by the AC power supply.

* * * * *